Dec. 30, 1952   J. H. O'NEIL   2,623,672
BEER JETTER
Filed April 15, 1949   3 Sheets-Sheet 1
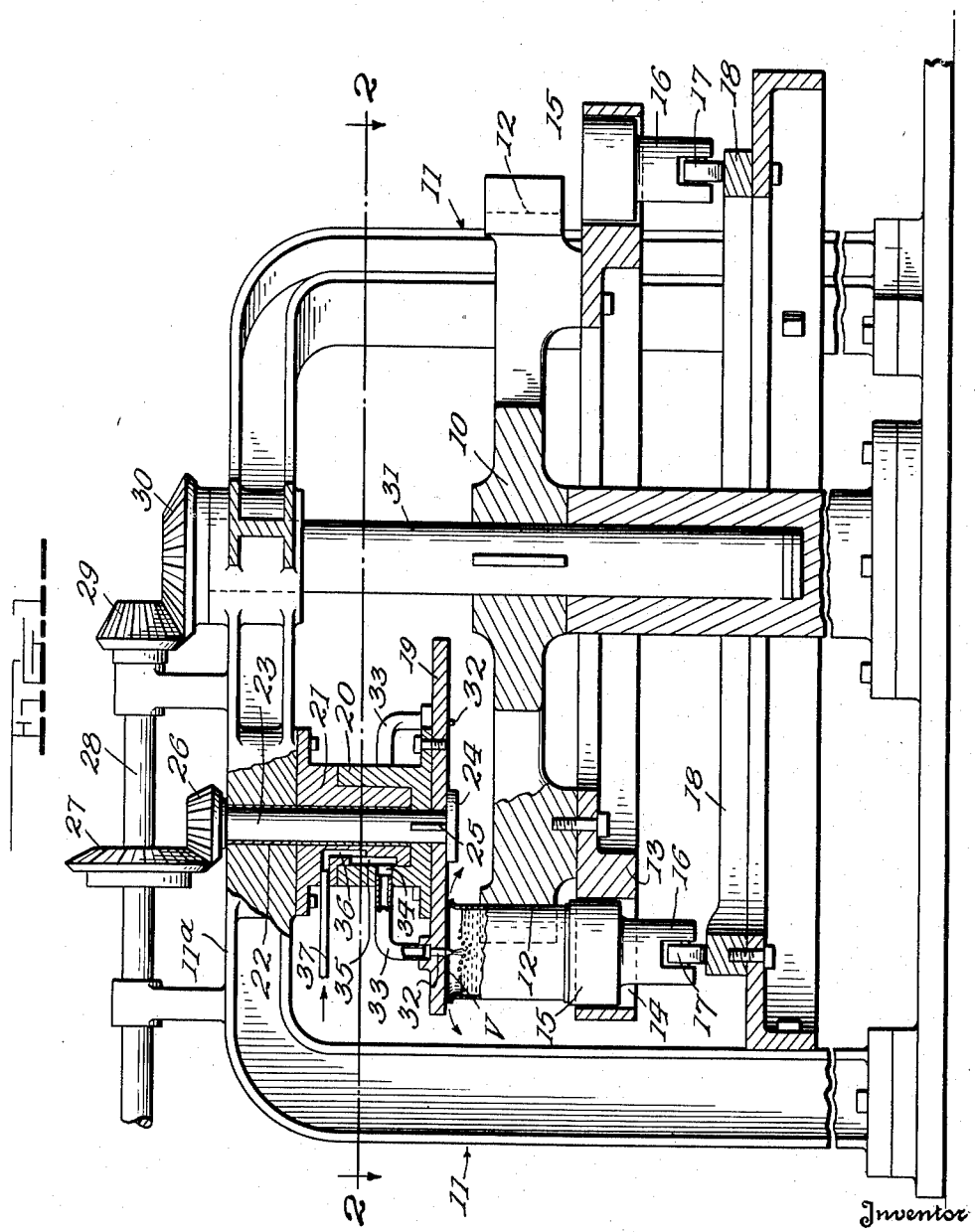
Inventor
James H. O'Neil,
By Mason, Porter, Diller T Stewart
attys.

Dec. 30, 1952 J. H. O'NEIL 2,623,672
BEER JETTER
Filed April 15, 1949 3 Sheets-Sheet 2
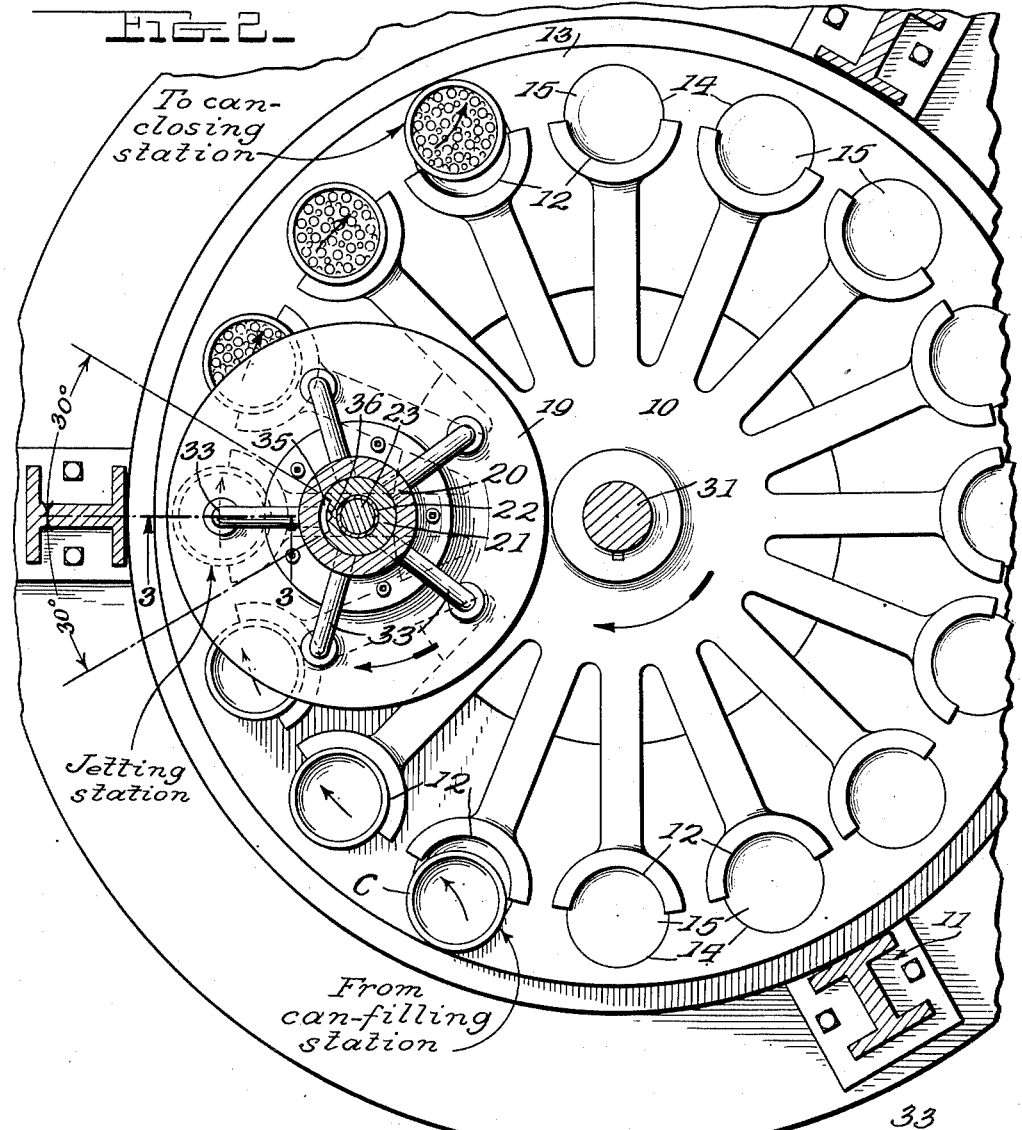
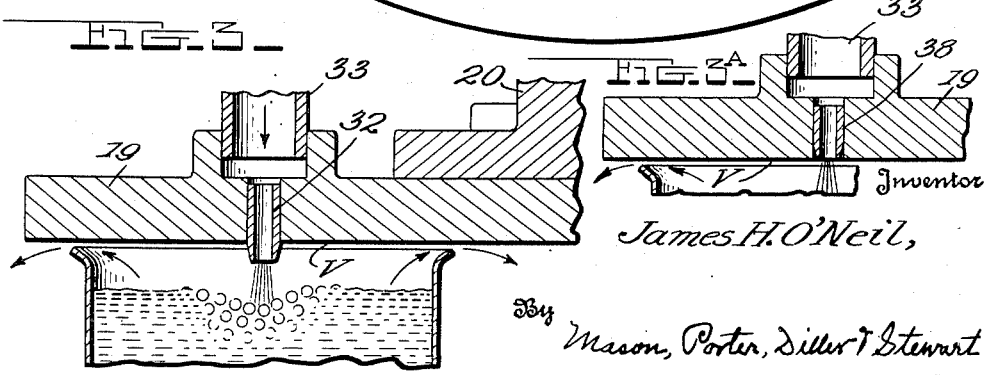
James H. O'Neil, Inventor
By Mason, Porter, Diller & Stewart
Attys.

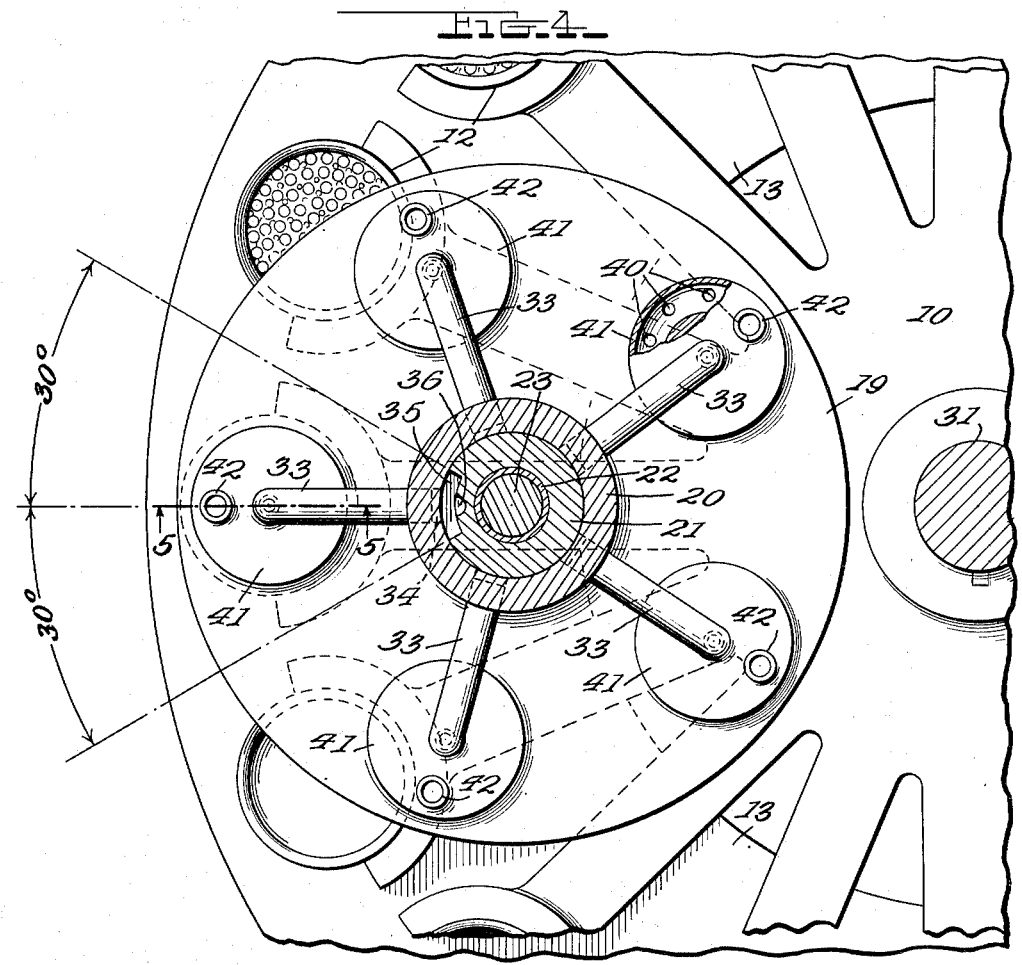
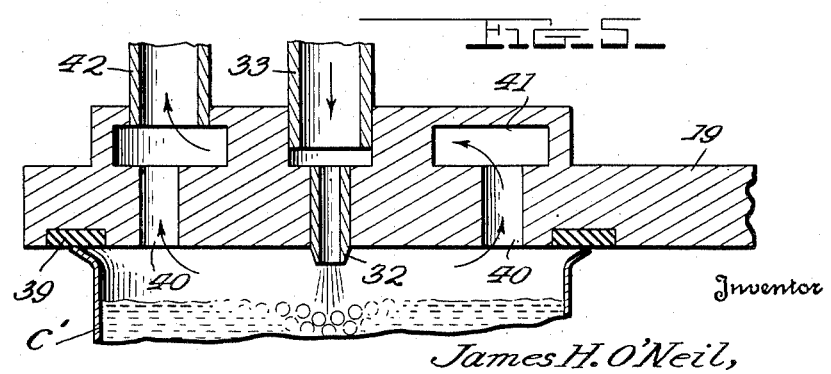

Patented Dec. 30, 1952

2,623,672

UNITED STATES PATENT OFFICE 2,623,672

BEER JETTER

James H. O'Neil, Syracuse, N. Y., assignor to Continental Can Company, Inc., New York, N. Y., a corporation of New York Application April 15, 1949, Serial No. 87,768

1 Claim. (Cl. 226—69)

The invention relates to new and useful improvements in a method of packaging beer in containers and more particularly in open top cans. The elimination of air from the head space of the container before sealing is recognized as desirable. Many expedients have been proposed and utilized for this purpose, including the directing of a jet of inert gas into the beer beneath the surface thereof through a nozzle submerged in the beer in an open top can for causing foam to fill the head space and force the air therefrom. The wide open mouth of the open top can presents difficulties when attempts are made to direct a jet of inert gas into the beer from a point above the surface of the beer, because the jetted stream entrains surrounding air which is driven into the beer along with the inert gas causing an excessive amount of air to be entrapped in the beer and foam. Also, the velocity of the jet must be controlled to avoid blowing the foam from the surface of the beer thereby causing excessive foaming and waste of beer.

An object of the invention is to provide a method of directing inert gas into an open top can partially filled with a gas containing beverage which includes the step of first covering the mouth of the can so as to provide a closed head space with a vent opening leading to the atmosphere and then directing a jet of inert gas through the closed head space at a point above the surface of the beer at a velocity sufficient to cause the gas to penetrate the surface of the beer for causing the beer to foam and fill the head space with foam.

The novel method is preferably carried out by mechanical means disposed between the filling machine and the closing machine. One form of mechanical means for carrying out the method is illustrated in the accompanying drawings in which:

Figure 1 is a view partly in vertical section and partly in side elevation, showing the essential features of a machine which may be used in carrying out the new method;

Figure 2 is a sectional view on the line 2—2 of Figure 1;

Figure 3 is an enlarged radial section through a portion of the covering means and the jetting means and showing the upper portion of a can positioned relative to the cover means so as to provide a vent opening for the air to escape from the head space;

Figure 3a is a sectional view similar to that shown in Figure 3, but showing a slightly modified arrangement of the jetting nozzle.

Figure 4 is a view partly in section and partly in plan showing a modified form of jetting means; and Figure 5 is a sectional view on the line 5—5 of Figure 4.

The illustrated embodiment of a machine for carrying out the improved method includes a rotating turret 10 mounted for rotation about a vertical axis in a frame structure 11. This turret is provided with a plurality of pockets 12—12. Attached to the turret and rotating therewith is an annular plate 13. Said plate is provided with cylindrical openings 14. The plate projects beyond the periphery of the turret and the cylindrical opening just referred to is directly beneath the pocket. Mounted in this cylindrical opening is a can support 15 which is fitted so as to reciprocate vertically in said cylindrical opening. There is a can support for each pocket and it is centered relative to the pocket so that when a can is placed on the support it will be firmly seated in the pocket.

The can support has a depending member 16 carrying a roller 17 which runs on a stationary cam 18 secured to the frame structure 11 of the machine. This turret is disposed between the filling machine and the closing machine and the cans from the filling machine are delivered one after another into the pocket of the turret. In Figure 2, the can C is just entering a pocket in the turret.

Mounted directly above the turret is a cover plate 19. The cover plate has a sleeve 20 bolted thereto. This sleeve fits over a bracket member 21 fixed to the upper frame member 11a. Extending through the frame member 11a and the member 11 is a bushing sleeve 22 in which a shaft 23 is mounted for rotation. The shaft 23 extends through the cover plate and is provided with a head 24 and keys 25 whereby the cover plate is firmly secured to the shaft and rotates therewith. At the upper end of the shaft 23 is a bevel gear 26 which meshes with a bevel gear 27 on the shaft 28. This shaft also carries a bevel gear 29 which meshes with a bevel gear 30 on the upper end of the shaft 31 to which the turret can is keyed. This shaft 31 is rotated by suitable means (not shown) and the rotations of the shaft will be communicated to the cover plate 19 through this gearing just described. The cover plate in diameter is much smaller than the turret and is disposed so that said cover plate overlies the path of travel of the cans on the turret.

As the turret rotates, the cans placed in the pockets thereof will be carried beneath the cover plate and while they are beneath the cover plate an inert gas is jetted through or across the head space of the can. This is brought about by providing the cover plate with a series of nozzles, one of which is indicated at 32 in Figures 1 and 3 of the drawings.

The stationary cam 18 is so shaped that as the turret approaches the region in which jetting takes place the can is raised to a position slightly spaced away from the bottom of the cover plate so that this space between the can flange and the cover plate provides a venting opening V for the air and excess foam to escape from the head space of the can.

Associated with each jetting nozzle is a pipe 33 which is connected with a port 34 in the sleeve 20. The bracket member 21 is provided with a header 35 and this header is connected through a port 36 with a pipe 37 leading to a source of inert gas. There are five nozzles carried by the cover plate and, of course, there are five pipes 33 connected to five different ports like the port 34. When the cover plate is in the position shown in Figure 2 then the pipe 33 is connected up to the header and the inert gas will be furnished to the nozzle. This gas is supplied under a pressure so that it flows from the nozzle in a jet. Referring to Figure 3, it will be noted that the can filled with beer so as to leave a proper head space has been brought beneath the cover plate 19 so that the head space in the can is closed except for this venting opening V. The turret rotates continuously and likewise the cover plate and the header 35 is of sufficient length so that as soon as the flange of the can is wholly beneath the cover plate, gas will be supplied through the pipe 33 and from the nozzle to the head space above the surface of the beer in the can.

The gas continues to pass from the nozzle into the beer while the cover plate is traveling through an arc of sixty degrees. Then the supply of gas is cut off and the can passes from beneath the cover plate and then out of the pocket and to the closing machine. The inert gas used is preferably $CO_2$.

The inert gas is under sufficient pressure to produce a jet velocity that will force the gas into and below the surface of the beer. This will cause a foaming of the beer and the bubbles will contain gas released from the beer and from the gas directed into the beer from the jetting device. The foam thus formed will force the air out of the head space and fill the head space with foam. Some of the foam will pass out through the vent opening V, but very little of the beer is wasted. This cover plate, covering the head space, permits the use of high jet velocities and prevents the blowing of the beer foam out of the can which would otherwise occur. The foaming of the beer will completely fill the head space with foam charged with inert gas and the excess foam will overflow through the vent opening. It is noted that the nozzle fits snugly within an opening in the cover plate. (See Figure 3.) When the jet passes from the nozzle into the head space of the container it does not entrain any air and carry it into the head space. The whole intent of applicant's method is to force the air out of the head space and when this can be done by a jet without carrying air into the head space the method is very much more efficient.

At the completion of the jetting operation the can is lowered by the roller 17 passing off from the high spot on the can 18 and thus the flange will be free to pass beneath the nozzle which projects slightly into the head space of the can during jetting.

In Figure 3ᵃ the nozzle 38 is shown as placed in the cover plate 19 so that the extreme lower end of the nozzle is flush with the lower side of the cover plate. In this arrangement no cam means for raising the can is necessary.

In Figures 4 and 5, there is shown a slightly modified form of jetting means. The cover plate 19 is the same as in the construction shown in Figures 1 to 3 so far as mounting and rotating the same. On the underface of the cover plate at each jetting unit there is an annular groove in which is set an annular gasket 39. The can, as indicated at C' is raised so as to bring the flange into contact with the gasket and this seals off and closes the head space. The nozzle 32 is the same construction as shown in Figure 1 and likewise a pipe 33 associated with each nozzle connects with a header 34 in the manner described above.

Instead of the venting opening V described above the cover plate is provided with one or more openings 40 which lead to a header 41 and a pipe 42 connected with the header permits the air to pass to the atmosphere from the head space. As the inert gas passes into the beer in the construction shown in Figure 5, the displaced air in the head space will pass into header 41 and out through pipe 42. Some foam will follow the air and pass up into the header. This assures that all the head space has been filled with foam.

In carrying out the method, the can is filled with beer by a filling machine and then passed inot this jetting machine. The can is filled so as to leave a proper head space which is initially filled with air. The first step in the new method consists in placing a cover over the can so as to close the head space but so as to provide also a venting opening leading to the atmosphere. After the head space has been closed then the next step consists in directing an inert gas through or across the head space above the surface of the beer in the can. The inert gas moving through or across the head space from the nozzle will force some air from the head space. The inert gas is also under sufficient pressure to produce a jet velocity that will drive the jet of gas into the beer causing the beer to foam.

The supply of inert gas continues until the head space is filled with the foam and then the gas cut off, the cover plate removed and the can with head space filled with the bubbles of beer will exclude the air from the head space until the can passes into the closing machine, a cover applied and seamed to the can so as to seal the same.

I claim:

The method of packaging beer in a can having a wide open top surrounded by a seaming flange, comprising placing the can beneath a covering plate so that the flange is slightly spaced away from the bottom of the covering plate, thus providing a venting opening permitting the escape of air and excess foam from the head space of the can, said opening being restricted to an extent effective to materially retard free escape of foam from the head space and free entrance of air into the head space, directing a vertical jet of inert gas free from entrained air into and through the head space from a point centrally thereof and above the surface of the beer and into the beer at a velocity sufficient to cause the gas to penetrate the surface of the beer causing the beer to foam, contact with the covering plate and progressively crowd all air out of the head space through the venting opening and substituting therefor an inert gas entrapped in the bubbles in the foam and then removing the covering and sealing the container.

JAMES H. O'NEIL.

REFERENCES CITED

The following references are of record in the file of this patent:

UNITED STATES PATENTS

| Number | Name | Date |
|---|---|---|
| 1,888,503 | Hoppe | Nov. 22, 1932 |
| 2,114,964 | MacKenzie | Apr. 19, 1938 |
| 2,140,187 | Kantor | Dec. 13, 1938 |
| 2,165,908 | Sparling et al. | July 11, 1939 |
| 2,204,833 | Stone | June 18, 1940 |
| 2,218,911 | Hopkins | Oct. 22, 1940 |
| 2,333,898 | Stevenson et al. | Nov. 9, 1943 |
| 2,338,108 | Gartland | Jan. 4, 1944 |
| 2,356,498 | Bargeboer | Aug. 22, 1944 |
| 2,372,457 | Stewart | Mar. 27, 1945 |
| 2,433,071 | Stevenson | Dec. 23, 1947 |